(12) United States Patent
Godwin et al.

(10) Patent No.: US 9,365,695 B2
(45) Date of Patent: Jun. 14, 2016

(54) POLYMER COMPOSITIONS COMPRISING TEREPHTHALATES

(75) Inventors: Allen David Godwin, Seabrook, TX (US); Claudius Gosse, Köln (DE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 130 days.

(21) Appl. No.: 13/133,317

(22) PCT Filed: Nov. 3, 2009

(86) PCT No.: PCT/US2009/063086
§ 371 (c)(1),
(2), (4) Date: Aug. 1, 2011

(87) PCT Pub. No.: WO2010/071717
PCT Pub. Date: Jun. 24, 2010

(65) Prior Publication Data
US 2011/0281987 A1   Nov. 17, 2011

Related U.S. Application Data

(60) Provisional application No. 61/138,798, filed on Dec. 18, 2008.

(51) Int. Cl.
*C08K 5/12* (2006.01)
*C08K 5/00* (2006.01)

(52) U.S. Cl.
CPC .................. *C08K 5/0016* (2013.01); *C08K 5/12* (2013.01); *C08K 2201/014* (2013.01)

(58) Field of Classification Search
CPC ........... C08K 5/10; C08K 5/12; C08K 5/0016
USPC ......................................................... 524/287
See application file for complete search history.

(56) References Cited

U.S. PATENT DOCUMENTS

| | | | |
|---|---|---|---|
| 3,736,348 A * | 5/1973 | Gough et al. ..................... 60/76 |
| 3,929,867 A | 12/1975 | McCollum et al. |
| 6,740,254 B2 | 5/2004 | Zhou et al. |
| 6,777,514 B2 | 8/2004 | Patil et al. |
| 7,297,738 B2 | 11/2007 | Gosse et al. |
| 7,361,779 B1 | 4/2008 | Holt et al. |
| 2005/0020718 A1 | 1/2005 | Gosse et al. |
| 2006/0183936 A1* | 8/2006 | Grass et al. .................. 560/128 |
| 2006/0247461 A1 | 11/2006 | Schlosberg et al. |
| 2007/0027242 A1* | 2/2007 | Storzum et al. ................ 524/296 |
| 2007/0037926 A1 | 2/2007 | Olsen et al. |
| 2007/0179229 A1* | 8/2007 | Grass ............................ 524/287 |
| 2008/0053863 A1 | 3/2008 | Glydon et al. |
| 2008/0058450 A1* | 3/2008 | Stimpson et al. ............. 524/296 |
| 2008/0242895 A1 | 10/2008 | Godwin et al. |
| 2011/0021680 A1 | 1/2011 | Colle et al. |

FOREIGN PATENT DOCUMENTS

| | | |
|---|---|---|
| EP | 1 808 457 | 7/2007 |
| WO | WO99/32427 | 7/1999 |
| WO | WO03/029339 | 4/2003 |
| WO | WO2004/046078 | 6/2004 |
| WO | WO2008/140177 | 11/2008 |

OTHER PUBLICATIONS

U.S. Appl. No. 61/040,480, filed Mar. 28, 2008.

* cited by examiner

*Primary Examiner* — Michael Pepitone
(74) *Attorney, Agent, or Firm* — Leandro Arechederra, III

(57) ABSTRACT

The invention is directed to plasticized compositions comprising esters of terephthalic acid, particularly PVC compositions.

10 Claims, No Drawings

POLYMER COMPOSITIONS COMPRISING TEREPHTHALATES

CROSS REFERENCE TO RELATED APPLICATIONS

This application is a National Stage entry under 36 U.S.C. §371 of International Application No. PCT/US2009/063086, filed Nov. 3, 2009, which claims the benefit of Ser. No. 61/138,798, filed Dec. 18, 2008, the disclosures of which are incorporated by reference in their entireties.

FIELD OF THE INVENTION

The invention relates to polymer compositions comprising terephthalate esters, and more particularly, but not exclusively, to PVC compositions plasticized with C5-C7 alcohol esters of terephthalic acid.

BACKGROUND OF THE INVENTION

Plasticizers are incorporated into a resin (usually a plastic or elastomer) to increase the flexibility, workability, or distensibility of the resin. The largest use of plasticizers is in the production of "plasticized" or flexible polyvinyl chloride (PVC) products. Typical uses of plasticized PVC include films, sheets, tubing, coated fabrics, wire and cable insulation and jacketing, toys, flooring materials such as vinyl sheet flooring or vinyl floor tiles, adhesives, sealants, inks, and medical products such as blood bags and tubing, and the like.

Other polymer systems that use of plasticizers include polyvinyl butyral, acrylic polymers, poly(vinylidene chloride), nylon, polyolefins, polyurethanes, silicon modified polymers, polysulphides and certain fluoroplastics. Plasticizers can also be used with rubber (although often these materials fall under the definition of extenders for rubber rather than plasticizers). A listing of the major plasticizers can be found in publications too numerous to mention.

Although the principal plasticizer for PVC are esters of phthalic acid (or the anhydride), recently there as been an effort to decrease the use of phthalate esters, particularly in end uses where the product contacts food, such as bottle cap liners and sealants, films, or for medical applications such as examination gloves, films, blood bags, and IV delivery systems, flexible tubing, or for toys, and the like. For these and most other uses of plasticized polymer systems, however, a successful substitute for phthalate esters has heretofore not materialized.

One such suggested substitute for phthalates are esters based on cyclohexane diacid esters. In the late 1990's and early 2000's, various compositions based on cyclohexanoate, cyclohexanedioates, and cyclohexanepolyacid esters were said to be useful for a range of goods from semi-rigid to highly flexible materials. See, for instance, WO 99/32427, WO 2004/046078, WO 2003/029339, U.S. Application No. 2006/0247461, and U.S. Pat. No. 7,297,738.

Other suggested substitutes include esters based on benzoic acid (see, for instance, U.S. Pat. No. 6,740,254, and also co-pending, commonly-assigned, U.S. App. Ser. No. 61/040,480 and polyketones, such as described in U.S. Pat. No. 6,777,514; and also co-pending, commonly-assigned, U.S. application Ser. No. 12/058,397. Epoxidized soybean oil, which has much longer alkyl groups (C16 to C18) has been tried as a plasticizer, but is generally used as a PVC stabilizer. Stabilizers are used in much lower concentrations than plasticizers. Esters based on glycerol are also a promising plasticizer for PVC and other polymer systems; see U.S. App. Ser. No. 61/040,490 and U.S. App. Ser. No. 61/040,480.

Di-2-ethyl-hexylterephthalate (DEHTP), sometimes referred to as Dioctylterephthalate (DOTP) has been described in the literature as a suitable candidate for a plasticizer since at least 1973.

U.S. Pat. Application 2005/0020718 teaches that esters of cyclohexane carboxylic acid esters may be used with terephthalates in PVC compositions. Among the specific terephthalates which are taught to be useful in combination with cyclohexane carboxylic acid ester include the alkyl terephthalates such as monomethyl terephthalate, dimethyl terephthalate, diethyl terephthalate, di-n-propyl terephthalate, di-n-butyl terephthalate, di-tert-butyl terephthalate, diisobutyl terephthalate, monoglycol esters of terephthalic acid, diglycol esters of terephthalic acid, di-n-octyl terephthalate, diisooctyl terephthalate, mono-2-ethylhexyl terephthalate, di-2-ethylhexyl terephthalate, di-n-nonyl terephthalate, diisononyl terephthalate, di-n-decyl terephthalate, di-n-undecyl terephthalate, diisodecyl terephthalate, diisododecyl terephthalate, di-n-octadecyl terephthalate, diisooctadecyl terephthalate, di-n-eicosyl terephthalate, monocyclohexyl terephthalate and or dicyclohexyl terephthalate.

A number of patents teach the use of terephthalate esters having low carbon numbers in the alcohol moieties, e.g., C4-C5 alcohols, in compositions with PVC, such as U.S. Pat. No. 7,361,779, and U.S. Pat. Application 2007/0037926.

U.S. Pat. Application 2008/0053863 discusses mixtures of C4-C8 terephthalates with butyls, acrylics, urethanes, polysulphides, and silicone modified polymers.

Other background references include EP 1 808 457 A, U.S. Pat. Nos. 3,736,348, 3,929,867, U.S. Patent Application 2007/027242, and WO 2008/140177.

The present inventors have surprisingly discovered that terephthalic dicarboxylic acid diesters synthesized with one or more of C5-C7 alcohols, particularly lightly branched C5-C7 alcohols, offer certain improved properties in compositions with PVC.

SUMMARY OF THE INVENTION

The invention is directed to compositions comprising at least one polymer and at least one plasticiser selected from C5-C7 alcohol di-esters of terephthalic acid. In embodiments the alcohol moiety may be branched or unbranched or a mixture of a branched and an unbranched alcohol. In other embodiments the alcohols may be single carbon number mixtures, such as an di-ester prepared from a mixture of isoheptanols, or from a mixture of alcohols of different carbon numbers such as di-esters of isohexanols and isoheptanols.

The C5-C7 alcohol di-esters of terephthalic acid are C5-C7 primary aliphatic alcohol di-esters of terephthalic acid, wherein the word "primary" is understood to mean that the C1 carbon to which the alcohol moiety is attached is itself attached to only one other carbon, and the word "aliphatic" is understood to mean acyclic.

In embodiments, the invention is directed to plastisols comprising the selected alcohol di-ester of terephthalic acid compositions of the invention and PVC and/or other plasticizable polymer which can be prepared by using a plastisol as an intermediate.

In a further embodiment the invention is also directed to compounds comprising one or more of the selected alcohol di-ester of terephthalic acid compositions of the invention and PVC and/or other plasticizable polymer which can be prepared by dry blending.

In a further embodiment the invention is also directed to plastisols comprising one or more of the selected alcohol di-esters of terephthalic acid as a viscosity modifier.

In a further embodiment the invention is also directed to flexible PVC compositions where one or more of the selected di-esters of terephthalic acid are used as a fast fusing plasticizer.

In a further embodiment the invention is also directed to flexible PVC compositions where one or more of the selected di-esters of terephthalic acid are used as a fast fusing plasticizer in combination with a slower fusing, non-phthalate plasticizer such as DOTP or diisononyl cyclohexanediacid ester or a epoxidized oil plasticizer.

In a further embodiment the invention is also directed to sealants, caulks and mastics comprising the selected alcohol ester of terephthalic acid compositions of the invention.

In any of the embodiments described herein, the at least one plasticiser may be selected from C6-C7 alcohol di-esters of terephthalic acid.

These and other objects, features, and advantages will become apparent as reference is made to the following detailed description, preferred embodiments, examples, and appended claims.

DETAILED DESCRIPTION

According to the invention, there is provided a composition comprising at least one polymer and at least one additive selected from C5-C7 alcohol di-esters of terephthalic acid.

In general the polymer will be a plasticizable polymer (or resin) and the terephthalate ester additive according to the invention will act as a plasticizer and thus will be present in plasticizing amounts, which can be determined by one of ordinary skill in the art in possession of the present invention. However, as will be made clear below, the terephthalate ester additive according to the invention will act, in embodiments, as something other than a plasticizer or in other cases as both a plasticizer and for some other function. Accordingly, it will be understood that the present inventors do not wish to be bound by theory as to whether such "additives" act as a plasticizer or not. It will be understood also that, unless otherwise specified, the additive of the invention may also be present as a co-plasticizer, i.e., at least one other plasticizing ester is at least partially for plasticizing purposes. This at least one other plasticizing ester may be a different terephthalate ester or it may be a non-terephthalate ester, or a combination thereof.

In embodiments, the polymer may be selected from PVC, butyl rubbers, acrylics, methacrylates, nylon, fluoroplastics, polystyrene, urethanes, polyurethanes, polysulphides, silicones, block copolymers, silicone modified polymers, and mixtures thereof.

In a preferred embodiment the polymer will be selected from PVC.

As used herein, the term "PVC" includes homopolymers of polyvinyl chloride resin(s), copolymers of polyvinyl chloride resin(s), and mixtures thereof. Copolymers of vinyl chloride are formed by the copolymerization of vinyl chloride and other monomers or monomer blends. Suitable monomers include vinyl acetate, ethylene, propylene, maleate, methacrylate, acrylate, high alcohol vinyl ester, urethane, chlorinated urethane, methylmethacrylate, and mixtures thereof. Examples of monomer blends include ethylene-vinyl acetate copolymer, acrylonitrile-butadiene-styrene terpolymer, acrylonitrile-butadiene copolymer, and mixtures thereof.

The monomers or monomer blends may be present and in an amount of up to 100 parts per hundred parts resin, or 90 parts per hundred parts resin, or 80 parts per hundred parts resin, or 70 parts per hundred parts resin, or 60 parts per hundred parts resin, or 50 parts per hundred parts resin, or 40 parts per hundred parts resin, or 30 parts per hundred parts resin, or 20 parts per hundred parts resin, or 10 parts per hundred parts resin (the term "parts per hundred parts resin" is used herein to define the quantity of the components based on the weight of the resin and is abbreviated "phr").

In embodiments, the PVC component of the present invention will have a degree of polymerization (DP) which is between 650 and 1600, preferably between 900 and 1100, and an inherent viscosity (IV) between 0.5 and 1.4 (based on ASTM D-1243). The PVC-based resin of the present invention may be formulated from a single PVC resin or a mixture of two or more different PVC resins. When two or more different PVC resins are used, the PVC resins preferably have degrees of polymerization which are relatively close in value.

PVC resins may also be described using K-values, the K-value being an indication of the mean molecular weight of polyvinyl chloride. The K value is the viscosity of a 0.005 wt % solution of the polyvinyl chloride in cyclohexanone at 25° C. as measured using an Ubbelhode viscometer in accordance with the German standard DIN 53726. The K value of the polyvinyl chloride impacts the fusion temperature and gellation rate of the plasticised polyvinyl chloride composition. The K value also influences the melt viscosity of the plasticised polyvinyl chloride composition and the rate at which the composition can be foamed. Typically the higher the K value the better the mechanical properties but the lower the flowability. Accordingly, the formulator of polyvinyl chloride will select the nature of the polyvinyl chloride and the nature of the plasticiser to optimise the properties for a particular use. Where a polyvinyl chloride composition is formulated according to the present invention, it is preferred to use a suspension or emulsion polymerised polyvinyl chloride having a K value in the range 62 to 70.

In embodiments the alcohol moiety of the terephthalate esters may be branched (i.e., a di-ester wherein both alcohol moieties are branched or a diester wherein one alcohol moiety is branched and the other alcohol moiety is unbranched), or unbranched (i.e., the diester wherein both alcohol moieties are unbranched). This concerns the situation with each individual molecule. In terms of the average across the entire sample of molecules, there may also be a collection of molecules wherein a certain percentage of the esters have all unbranched alcohol moieties, all branched moieties, or a mixture of branched and unbranched. Unless otherwise specified herein, when "branching" is referred to, what is meant is the average across the entire sample with respect to each alcohol moiety. Thus, in embodiments the alcohol moiety has a branching of from about 0.2 to about 1.6 branches, on average, per alcohol moiety, or in other embodiments from about 0.2 to about 1.4 branches, on average, per alcohol moiety, or in still other embodiments from about 1.2 to about 1.4 branches, on average, per alcohol moiety.

In embodiments, preferred alcohols to be condensed with terephthalic acid are selected from the group consisting of n-pentanol, 2-methyl butanol, 3-methyl butanol, 2,2-dimethyl propanol, n-hexanol, 2-methyl pentanol, 3-methyl pentanol, 4-methyl pentanol, 2,3-dimethyl butanol, 2-ethyl butanol, n-heptanol, 2-methyl hexanol, 3-methyl hexanol, 4-methyl hexanol, 5-methyl hexanol, 2,3-dimethyl pentanol, 2,4-dimethyl pentanol, 3,4-dimethyl pentanol, 2-ethyl pentanol, 3-ethyl pentanol, and mixtures thereof.

The methods of attenuation of the branching on the alcohol molecules are not the subject of the present invention but rather have been the subject of numerous patents such as U.S.

Pat. No. 6,437,170, and can be accomplished by one of ordinary skill in the art without more than routine experimentation. Likewise, whether the final esterified product is derived from esterification of the corresponding alcohol and 1,4-benzene-dicarboxylic acid or by transesterification of 1,4-dimethylterephthalate ester with the desired alcohol(s) is also not the subject of the present invention, but also may be accomplished without more than routine experimentation by one of ordinary skill in the art in possession of the present disclosure.

U.S. Pat. No. 7,361,779 describes the production of di-butyl terephthalates beginning with mixtures of butanols and reacting these with dimethyl terephthalate. U.S. Pat. Appl. 20070179229 includes a description of the preparation of C4 and C5 terephthalate esters by the transesterification of dimethyl terephthalate with butanols or pentanols. U.S. Pat. No. 7,276,621 is focused on the preparation of di-2-ethyl hexyl terephthalate from terephthalic acid at elevated temperatures and elevated pressures.

The most important uses of compositions according to the present invention are as plastisols, which can be molded, spread, sprayed, coated or processed into a variety of applications including vinyl sheet flooring, toys, wall coverings, synthetic leather and other fabrics and in compounding applications.

In embodiments the composition according to the invention will be prepared in the form of a plastisol and then processed in a manner appropriate for the end use. This may be done by one of ordinary skill in the art in possession of the present disclosure without more than routine experimentation.

Plastisols are generally dispersions of organic polymers in plasticizers which gel on heating to relatively high temperatures of about 170° C. and cure on cooling to form the flexible PVC product. Plastisols typically comprise finely powdered polyvinyl chloride. Additionally they can contain copolymers of vinyl chloride and, more recently, methacrylate copolymers or styrene copolymers. These finely powdered polymers are dispersed in a liquid plasticizer and form the paste-like plastisol. The plastisols are used for various applications. They may be used, for example, as sealing compounds, for impregnating and coating substrates of textile materials, and as adhesives. In the automotive industry, plastisols according to the invention may be used for interior applications like coated fabrics or dashboards, for under body protection, for sealing seams, for lining hoods, as vibration-damping materials or as adhesives. Other products prepared from plastisols include toys, vinyl flooring, floor mats, coated fabrics for wall coverings or tarpaulins, tool handles, end caps, and the like. Plastisols according to the invention may be processes according to methods known to one of ordinary skill in the art and such processes do not per se form a part of the present invention.

Depending on the particular application envisaged, the plastisols contain other additives in addition to the fine-particle polymer powders and the liquid plasticizers. These other additives include, for example, fillers, coupling agents, lubricants, stabilizers, flow aids, water-absorbing substances, pigments or blowing agents.

In preferred embodiments the plastisol compositions of the invention will comprise at least one C5-C7 alcohol di-esters of terephthalic acid, more preferably at least one C5-C7 alcohol di-ester, and still more preferably at least one C6-C7 di-ester, and yet still more preferably the C7 di-ester.

One of the advantages of the present invention is that, in a preferred embodiment, the di-C7 terephthalate ester (DIHTP) of the invention meets the criteria of low volatility, good fusion and/or solvation characteristics, good plastisol viscosity properties that do not change much upon storage, and provides a good flexible PVC product.

One advantageous use of the C5-C7 alcohol di-esters of terephthalic acid is as a modifier for mastics, caulks, and sealants. Mastics, caulks, and sealant are used to seal off or to provide a flexible joint between different materials to exclude dust, dirt, moisture, chemicals, and the like, to reduce noise and vibration, to insulate or to serve as space fillers. While often based on phthalates or alkylsulfonic esters of phenol (e.g., Mesamoll™ from Bayer), an increasing amount of sealant and mastics is produced using polyurethane, acrylics, block copolymers, silicones, or polysulphides. Typically any and all of these base polymer systems contain various amounts of plasticizer depending on specific composition, processing, and end use, but generally the amount of plasticizer is in the range of 1 to 30% by weight. The C5-C7 alcohol di-esters of terephthalic acid are useful plasticizers for these mastics and sealants. With acrylic mastics, caulks, and sealants, in addition to providing a role of making the sealant flexible, these C5-C7 alcohol di-esters of terephthalic are useful coalescing additives.

The C5-C7 alcohol di-esters of terephthalic acid have also been found to be useful as viscosity modifiers, wetting agents for fillers and substrates, particularly as a wetting agent for applying mastics, sealants, and other coatings. More generally, compositions containing filler, pigments, lubricants, stabilizers, viscosity depressants, blowing agents, adhesion promoters, and flame retardants, and/or compositions which are to be applied (or can be applied) by knife, gun, manual or metered dispenser can benefit by addition of C4-C7 and C9-C13 alcohol esters of terephthalic acid.

The invention may be better understood, and additional benefits to be obtained thereby realized, by reference to the following examples. These examples should be taken only as illustrative of the invention rather than limiting, and one of ordinary skill in the art in possession of the present disclosure would understand that numerous other applications are possible other than those specifically enumerated herein.

C7 and C9 terephthalate esters were synthesized using terephthalic acid (purchased from Acros Organics) and Exxal™ 7 alcohol (isoheptanol) and Exxal™ 9 alcohol (isononanol), respectively, available from ExxonMobil Chemical Company, using a tetraisopropyl titanium catalyst according to established procedures. In the case of the C9 di-ester (di-isononyl terephthalate or DINTP), a second neutralisation step, followed by washing and then drying over $MgSO_4$ was required to get a clear but slightly yellowish liquid. A similar procedure was followed to obtain a similarly appearing C7 di-ester product (di-isoheptyl terephthalate or DIHTP) but here the preferred route for plasticizer preparation was the transesterification of dimethyl terephthalate with Exxal 7 alcohol using the same catalyst system. The advantages of starting with dimethyl terephthalate instead of terephthalic acid for lower molecular weight alcohols include faster esterifications rates and lower finished product color. Comparisons of these compounds and other similarly-prepared C4-C13 ester products that appear herein were made against the commercially available DEHTP (or di-2-ethylhexylterephthalate) from Eastman Chemical Company (Eastman™ 168).

Examples of flexible PVC products which can be made using DIHTP are given in the following examples.

Example 1

Backing for Carpet Tile

| Ingredient | Parts |
| --- | --- |
| PVC Homopolymer | 25 |
| PVC Copolymer | 75 |
| DIHTP | 100 |
| CaCO3 | 250 |
| CaZn Stabilizer | 2 |
| Carbon Black | 1.5 |

Example 2

PVC Foam Layer for Flooring

| Ingredient | Parts |
| --- | --- |
| PVC (homo and/or copolymer) | 100 |
| DIHTP | 40-60 |
| ESO | 5 |
| CaCO3 | 0-30 |
| Blowing Agent | 3-5 |
| TiO2 | 0-4 |
| ZnO | 0.5 |
| Stabilizer | 1-2 |

Example 3

PVC Underbody Sealant

| Ingredient | Parts |
| --- | --- |
| PVC (homo and/or copolymer) | 100 |
| DIHTP | 80-120 |
| CaCO3 | 80-120 |
| Adhesion Promoters | as needed |
| Thixotropes | as needed |

Example 4

Spread Coating Layer

| Ingredient | Parts |
| --- | --- |
| PVC Dispersion Resin | 100 |
| DIHTP | 40-70 |
| CaCO3 | 0-20 |
| Flame Retardant | as needed |
| Stabilizer | 2-3 |
| ESO | 0-5 |
| Pigment | as needed |

Example 5

Conveyor Belt Covering

| Ingredient | Parts |
| --- | --- |
| PVC Dispersion Resin | 100 |
| DIHTP | 60-90 |
| Filler (e.g., CaCO3) | 0-25 |
| Antistats | 5-10 |
| Stabilizer | 2-3 |
| Pigments | as needed |
| Other Additives | as needed |

Example 6

Rotomolded Toy

| Ingredient | Parts |
| --- | --- |
| PVC | 100 |
| DIHTP | 40 |
| TXIB | 20 |
| CaCO3 | 5 |
| Stabilizer | 2.5 |
| Epoxidized soy bean oil | 3 |
| Pigment | as needed |
| Other additives | as needed |

The use of DIHTP in these applications provides clear improvement over the current commercially available DOTP (2-ethyl hexyl terephthalate). The DIHTP has improved compatibility and improved performance advantages in plastisol applications with lower plastisol viscosity and reduced fusion temperatures. The foaming ability, fusion characteristics, and plastisol viscosity of these compositions are improved versus the same compositions using DOTP.

This same advantage in lower fusion temperature and lower plastisol viscosity is seen in the other C5-C7 esters of terephthalic acid. These advantages are especially important in coating applications, flooring, rotomolded toys, and wall coverings. Processes involving dipping (e.g., in the manufacture of gloves), rotational moulding (e.g., balls and doll heads), spraying (automotive undercoating), slush moulding (automotive dashboard), or mould casting (e.g., bottle cap liners) are particularly advantages process for PVC compositions comprising the lower molecular weight esters of terephthalic acid.

The terephthalate plasticizer compounds may be used alone, together or they may be used in combination with additional plasticizers in the PVC composition. Examples of such additional plasticizers include, but are not limited to, dioctyl phthalate, di-2-ethyl hexyl phthalate, diisooctyl phthalate, diisononyl phthalate, di-linear nonyl phthalate, di-linear nonyl, undecyl phthalate, di-linear undecyl phthalate, diundecyl phthalate, diisodecylphthalate, $C_6$-$C_{10}$ straight-chain phthalates, $C_7$ linear phthalate, $C_9$ linear phthalate, di(2-propylheptyl phthalate), texanolbenzylphthalate, polyester phthalate, dicaprylphthalate, butylcyclohexyl phthalate, dicyclohexyl phthalate, butyl octyl phthalate, dioctyl terephthalate, di-2-ethyl hexyl terephthalate, dioctyl adipate, di-2-ethyl hexyl adipate, diisononyl adipate, diisooctyl adipate, acetyl triethyl citrate, tri-n-butyl citrate, acetyl tri-n-butyl citrate, acetyl tri-m n-hexyl citrate, n-butyl tri-n-hexyl citrate, isononyl benzoate, isodecyl benzoate, isononyl toluate, isodecyl toluate, 1,4 cyclohexane dimethanol dibenzoate, 2,2,4 trimethyl-1,3 pentane diol dibenzoate, 2,2,-dimethyl-1,3 propanediol dibenzoate, $C_{10}$-$C_{21}$ alkane phenol esters or alkyl sulphonic phenol ester, acetic acid reaction products with fully hardened castor oil, pentaerythritol tetrabenzoate, pentaerythritol tetra 2-ethylhexanoate, glycerol tribenzoate, polypropylene glycol dibenzoate, triarylphosphates, polymers of adipic acid/phthalates/adipates/sebecates/ with glycols and often acid terminated, butyl benzyl phthalate, alkylbenzyl phthalate, $C_7$-$C_9$ butyl phthalate, diethylene glycol dibenzoate, di propylene glycol dibenzoate, 2-ethylhexyl benzoate, texanolbenzoate, ethylene glycol dibenzoate, propylene glycol dibenzoate, triethylene glycol dibenzoate, di-isononylcyclohexane dicarboxylic acid ester, di-2-ethyl hexyl cyclohexanedicarboxylic acid ester, and mixtures thereof. The plasticizer or plasticizers are present in the compositions of the present invention in amounts ranging from about 20 to 200 PHR, more typically about 30 to about 120 PHR, more preferably about 40 to about 120 PHR, still more preferably about 50 to about 100 PHR, and most preferably from about 60 to 80 PHR, with ranges from any lower amount to any higher amount also being preferred embodiments, e.g., 40 to 80 PHR, 20 to 80 PHR, 40 to 100 PHR, and so on. In embodiments, the one or more di-05, di-C6, and di-C7 terephthalate esters of the invention constitute from 10 to 100 wt % of the plasticizer system, preferably about 15 to 60 wt % of the total plasticizer system.

One particular advantage of the C5-C7 primary alcohol di-esters of terephthalic acid is their use to lower the fusion temperature of polymer crystallites in a polymer system comprising plasticizers that are slower fusing. When a plasticized product is produced, such as a PVC product, the product should reach a temperature at some point during fabrication at which the polymer crystallites are melted. This is called the fusion temperature. In the case of PVC, depending upon the plasticizer, this temperature generally ranges from 160 to 180° C. Plasticizers which are better solvents for a given polymer will fuse at lower temperatures than those that are poorer solvents. Since many plasticized polymer products, such as flexible PVC products, are produced through continuous processes, those faster or stronger solvating plasticizers will arrive at this fusion temperature faster; hence the development of the descriptor "fast fusing" or "faster fusing". These same plasticizers are also known as strong solvating plasticizers.

The C5-C7 primary aliphatic alcohol di-esters of terephthalic acid according to the invention, may be added to polymeric systems comprising slower fusing plasticizers in order to lower at least one of, and preferably both of the solution temperature and hot bench gelation temperature of said polymeric systems. Another characteristic of the C5-C7 primary aliphatic alcohol di-esters of terephthalic acid according to the invention is that they may be used to replace at least a portion of other slower fusing plasticizers in a polymeric system with the result that less total plasticizer needs to be used. Thus, in other embodiments, the C5-C7 primary aliphatic alcohol di-esters of terephthalic acid according to the invention are used as faster fusing plasticizers, relative to the plasticizers they displace, to lower at least one of, and preferably both of, the solution temperature and hot bench gelation temperature of said polymeric systems and/or used to replace at least a portion of one or more plasticizers in said polymeric system with the result that less total plasticizer needs to be used.

The "solution temperature" is demonstrated through the use of a simple test procedure. In this test, 48 grams of the plasticizer to be tested is mixed with 2 grams of the polymer system, such as PVC resin, at room temperature. The mixture is slowly heated, with stirring, until the PVC resin dissolves. The temperature at which the polymer system, e.g., PVC resin dissolves in the plasticizer is recorded as the "solution temperature". More specifics of the experimental design are not necessary for one of ordinary skill in the art since the important factor is how the plasticizer performs in the experiment relative to DEHP. Other test procedures that can be used to evaluate faster fusing plasticizers are the hot bench plastisol gelation method and the dynamic mechanical analysis of plastisols, both per se well-known in the art.

In embodiments, the plasticizers of the invention have both solution temperatures and hot bench gelation temperatures lower than those reported for di-ethylheptyl phthalate (DEHP).

Faster fusing plasticizers are valued in the production of many flexible articles, particularly flexible PVC articles. See, for instance, U.S. Pat. No. 7,297,728. Faster fusing plasticizers based on non-phthalates are also known. For instance, the present inventor has recently described, alone or with others, faster fusing plasticizers based on cyclohexanoic acid esters of C4-C7 secondary alcohols (U.S. App. Ser. No. 60/991,314, filed Nov. 30, 2007), plasticizers based on cyclohexanoic acid esters of C7-C12 secondary alcohols (U.S. App. Ser. No. 60/991,307, filed Nov. 30, 2007), coplasticizer systems based on cyclohexanoic acid esters and non-phthalate fast fusing plasticizers, and also polyols as fast fusing plasticizers, U.S. App. Ser. No. 61/040,480. See also U.S. Pat. No. 7,323,588.

The compositions of the present invention may also contain one or more stabilizers, which are per se well-known in the art. Particularly preferred stabilizers to be used in compositions according to the present invention include: metal salts, especially those of calcium, barium, and zinc; organic phosphites, epoxy compounds, tin stabilizers, and mixtures thereof. The stabilizers provide protection against deficient PVC homopolymerization and copolymerization, and functions to eliminate or retard the process of polymer degradation. The total amount of stabilizer present in the compositions ranges from 0.1 to 8 PHR, preferably from 1 to 6 PHR, and most preferably 2 to 5 PHR. In an embodiment, a particularly preferred stabilizer is a mixture of metal salts and epoxy compounds, with or without organic phosphites.

In embodiments, metal salt stabilizers include zinc stearate, barium stearate, calcium stearate, cadmium stearate, barium ricinolate, barium phenate, calcium oleate, calcium laurelate, zinc octoate, calcium octanoate, and mixtures thereof. Preferably, the metal salt stabilizers are mixtures of barium stearate, zinc stearate and cadmium stearate. A preferred barium stearate/zinc stearate mixture is sold by Baerlocher (UBZ-791), and preferred calcium stearate/zinc stearate and barium stearate/cadmium stearate mixtures are sold by Azko Interstab. (CZ-19A and BC-103L, respectively). Epoxy compound stabilizers include epoxy soybean oil, e.g., Drapex™ 6.8, ESO, epoxy linseed oil, epoxy polybutadiene, epoxy methylstearate, epoxy stearate, epoxy ethylhexyl stearate, epoxy stearyl stearate, bis-phenol A diglycidyl ether, vinyl dicyclohexanediepoxide, 2,2-bis-(4-hydroxyphenol) propane and epichlorohydrine condensation copolymeration, and mixtures thereof. Organic phosphite stabilizers include diphenyldecyl phosphite, triphenyl phosphite, tris-nonylphenyl phosphite, tri-stearyl phosphite, octyldiphenyl phosphite, and mixtures thereof. Tin stabilizers include tin dilaurate, dibutyl tin maleate, organic tin mercaptide and organic tin sulfonic amide, and mixtures thereof.

The above stabilizers may be used individually or in any combination. In embodiments, the stabilizers are mixtures of zinc stearate, barium stearate, calcium stearate, and epoxy compounds. A preferred epoxy stabilizer is epoxy soybean oil. In addition, organic phosphites may be used in conjunction with the zinc stearate, barium stearate, cadmium stearate, and epoxy compound mixtures. Particularly preferred stabilizer mixtures are barium stearate/zinc stearate and epoxy soybean oil, calcium stearate/zinc stearate and epoxy soybean oil, and barium stearate/cadmium stearate and epoxy soybean oil.

In addition to PVC or a PVC-based resin, the terephthalate plasticizer compounds primary plasticizer(s) and optional stabilizer(s), the compositions of the present invention may include additional additives, such as anti-static agents, anti-fogging agents, ultra-violet inhibitors, anti-oxidants, light stabilizers, fire retardants, pigments, fillers, lubricants, foaming agents, and mixtures thereof. These additives are generally known in the art and may be present in the compositions in an amount sufficient to impart the desired property (generally below 10 PHR).

The invention has been described above with reference to numerous embodiments and specific examples. Many variations will suggest themselves to those skilled in this art in light of the above detailed description. All such obvious variations are within the full intended scope of the appended claims. Particularly preferred embodiments include the ability to produce phthalate-free flexible PVC products using a plasticizer system that minimizes processability and compatability problems, and the ability to improve the processability and performance of other non-phthalate flexible PVC products based on slower fusing non-phthalate plasticizers such as di-2-ethyl hexyl terephthalate and cyclohexanediacid esters of isononyl alcohol or 2-ethyl hexanol.

Trade names used herein are indicated by a ™ symbol or ® symbol, indicating that the names may be protected by certain trademark rights, e.g., they may be registered trademarks in various jurisdictions.

All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted. When numerical lower limits and numerical upper limits are listed herein, ranges from any lower limit to any upper limit are contemplated.

What is claimed is:

1. A plastisol composition comprising PVC, a first plasticizer of di-isoheptyl terephthalate, and a second plasticizer; wherein the plastisol composition comprises 40 wt % or more of the first plasticizer and the second plasticizer, based upon the total weight of the plastisol composition:
    wherein the composition further comprises a di-isononyl phthalate, di-2-ethyl hexyl phthalate, di-2-propyl heptyl phthalate, di-2-ethyl hexyl cyclohexane dicarboxylic acid ester, a citrate ester, an aromatic acid mono- or di-ester of phenol, an mono-, di-, or tri-ester of glycerol, trimethyl propanol, pentaerytheritol, or mixtures thereof.

2. The composition according to claim 1, wherein said di-isoheptyl terephthalate is present in the amount of from 20 to 100 PHR, based on the total weight of said composition.

3. The composition according to claim 1, further comprising a phthalate plasticizer.

4. A toy, medical device, sealant, caulk, or mastic comprising the composition according to claim 1.

5. A process comprising dryblending the composition according to claim 1.

6. A composition according to claim 1, said composition essentially free from phthalates, wherein essentially free is characterized as the presence of phthalates in an amount no greater than that of an inevitable impurity.

7. The composition according to claim 6, further comprising at least one other plasticizer selected from the group consisting of epoxidized vegetable oils, soyates, and mixtures thereof.

8. An article made from a composition according to claim 6.

9. The composition of claim 1, with the proviso that the composition is not an adhesive composition.

10. The composition of claim 1, wherein the composition comprises 45 wt % or more of the first plasticizer and the second plasticizer, based upon the total weight of the composition.

* * * * *